United States Patent

Hart

[11] 4,090,723
[45] May 23, 1978

[54] TANDEM ROADWHEEL LEVELING SYSTEM FOR CONSTRUCTION VEHICLES

[75] Inventor: Cullen P. Hart, Peoria, Ill.

[73] Assignee: Caterpillar Tractor Co., Peoria, Ill.

[21] Appl. No.: 761,928

[22] Filed: Jan. 24, 1977

[51] Int. Cl.² .............................................. B60G 17/00
[52] U.S. Cl. ................................... 280/6 H; 280/6.11
[58] Field of Search .............. 267/11 A; 280/6 H, 6.1, 280/6.11

[56] References Cited

U.S. PATENT DOCUMENTS

| 2,636,290 | 4/1953 | Bell ........................ 280/6.1 |
| 3,198,277 | 8/1965 | Trivero .................... 280/6 H |
| 3,328,019 | 6/1967 | Wilson ..................... 267/11 |
| 3,712,404 | 1/1973 | Walquist ................... 280/6 H |
| 3,842,926 | 10/1964 | Williams et al. ........... 280/6 H |
| 3,871,635 | 3/1975 | Unruh et al. .............. 280/6.11 |
| 3,924,704 | 12/1975 | Lindblom et al. .......... 280/6 H |
| 3,953,040 | 4/1976 | Unruh et al. .............. 280/6.11 |
| 3,970,327 | 7/1976 | Dezelan .................... 280/6 H |

FOREIGN PATENT DOCUMENTS

| 1,530,531 | 8/1973 | Germany. |
| 1,335,758 | 10/1973 | United Kingdom. |

Primary Examiner—Richard A. Bertsch
Attorney, Agent, or Firm—Phillips, Moore, Weissenberger, Lempio & Majestic

[57] ABSTRACT

A construction vehicle, such as a motor grader, comprises a frame having a pair of tandem roadwheel assemblies mounted on each lateral side thereof. Each roadwheel assembly comprises a pair of tandem roadwheels each rotatably mounted on an outer end of a lever arm which has its inner end pivotally mounted on the frame of the vehicle. A double-acting hydraulic cylinder is pivotally interconnected between the lever arms to selectively pivot the roadwheels to adjust the vertical height of one side of the vehicle relative to the other side thereof. An accumulator is preferably connectable with the cylinder to provide a damped suspension spring for absorbing road shocks and the like. Each of the roadwheels is preferably driven by a gear train connected to a driven output shaft of the engine of the vehicle. In a first embodiment of this invention, the inner end of each lever arm is pivotally mounted at a separate pivot point on the frame of the vehicle whereas in a second embodiment thereof the lever arms are pivotally mounted at a common pivot point on the frame.

10 Claims, 8 Drawing Figures

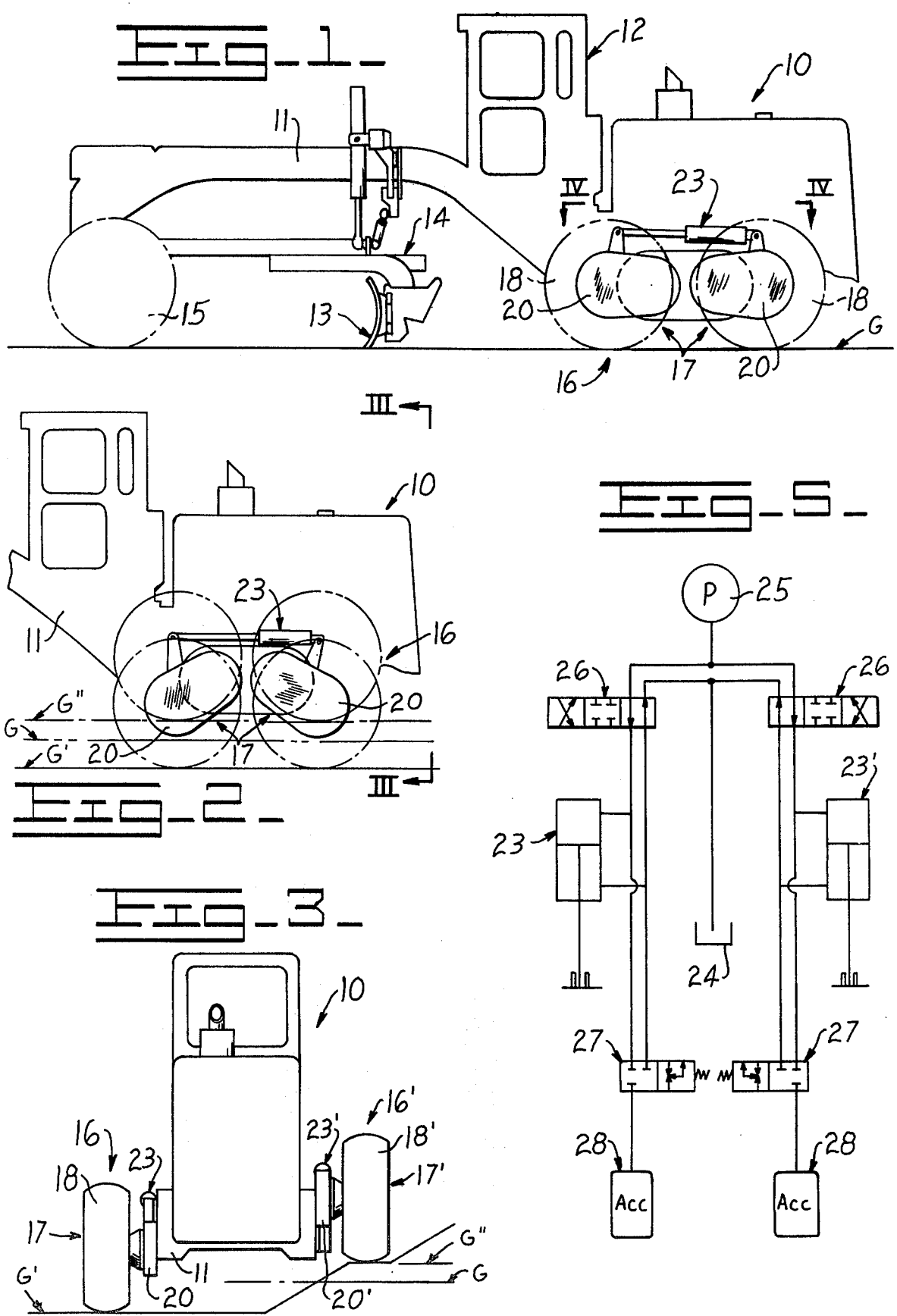

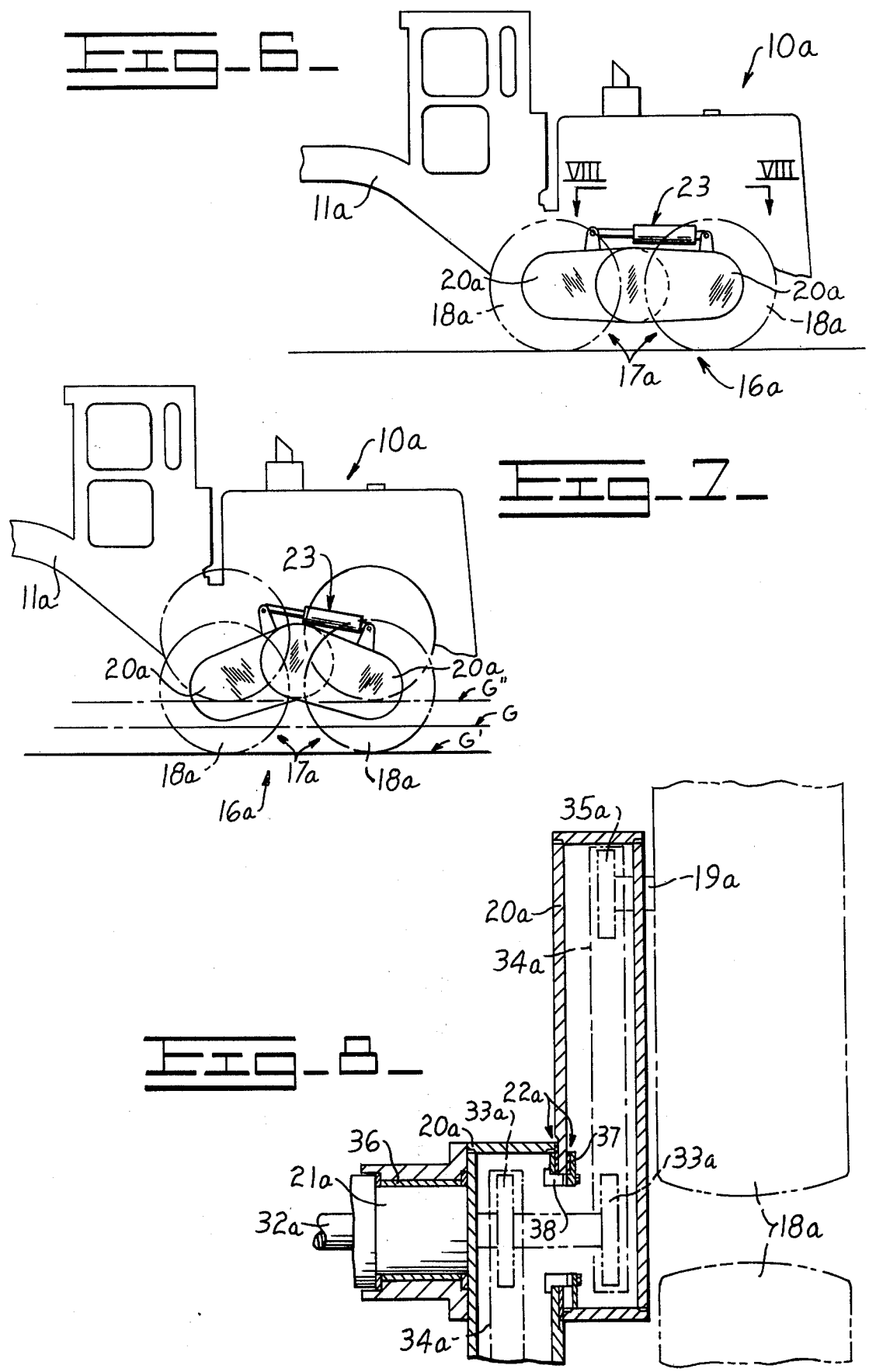

4,090,723

TANDEM ROADWHEEL LEVELING SYSTEM FOR CONSTRUCTION VEHICLES

BACKGROUND OF THE INVENTION

This invention relates to a leveling system for tandem roadwheels employed on a construction vehicle, such as a motor grader.

A motor grader is oftentimes operated over uneven terrain whereby one pair of the rear tandem roadwheels employed thereon are placed vertically below the tandem roadwheels mounted on the opposite side of the motor grader. The resulting tilting of the vehicle may thus give rise to operational problems such as reduced tractive effort of the vehicle and a reduction in drawbar pull. In addition, conventional tandem mounted rubber tires employed on conventional motor graders essentially function as undamped springs which do not provide the suspension desiderata desired for earthworking operations.

SUMMARY OF THIS INVENTION

The present invention is directed to overcoming one or more of the problems as set forth above.

According to the present invention, a tandem roadwheel leveling system is employed on a construction vehicle, preferably a motor grader, to selectively maintain the vehicle in a level and stable condition of operation or in a desired degree of tilt to improve the work position of a work tool, such as a blade thereof. The vehicle comprises a frame having a pair of tandem roadwheel assemblies pivotally mounted on each lateral side thereof. An actuating means is adapted to selectively pivot the roadwheel assemblies simultaneously relative to each other and relative to the frame of the vehicle for leveling purposes. The actuating means is further adapted to provide suspension springs for the roadwheel assemblies.

DETAILED DESCRIPTION OF THE DRAWINGS

Other objects of this invention will become apparent from the following description and accompanying drawings wherein:

FIG. 1 is a side elevational view of a motor grader employing the tandem roadwheel leveling system of this invention thereon;

FIG. 2 illustrates a tandem drive arrangement of the leveling system in a pivoted position whereby roadwheels thereof are moved vertically relative to ground level;

FIG. 3 is a rear elevational view of the motor grader, taken in the direction of arrows III—III in FIG. 2;

Figure 4:
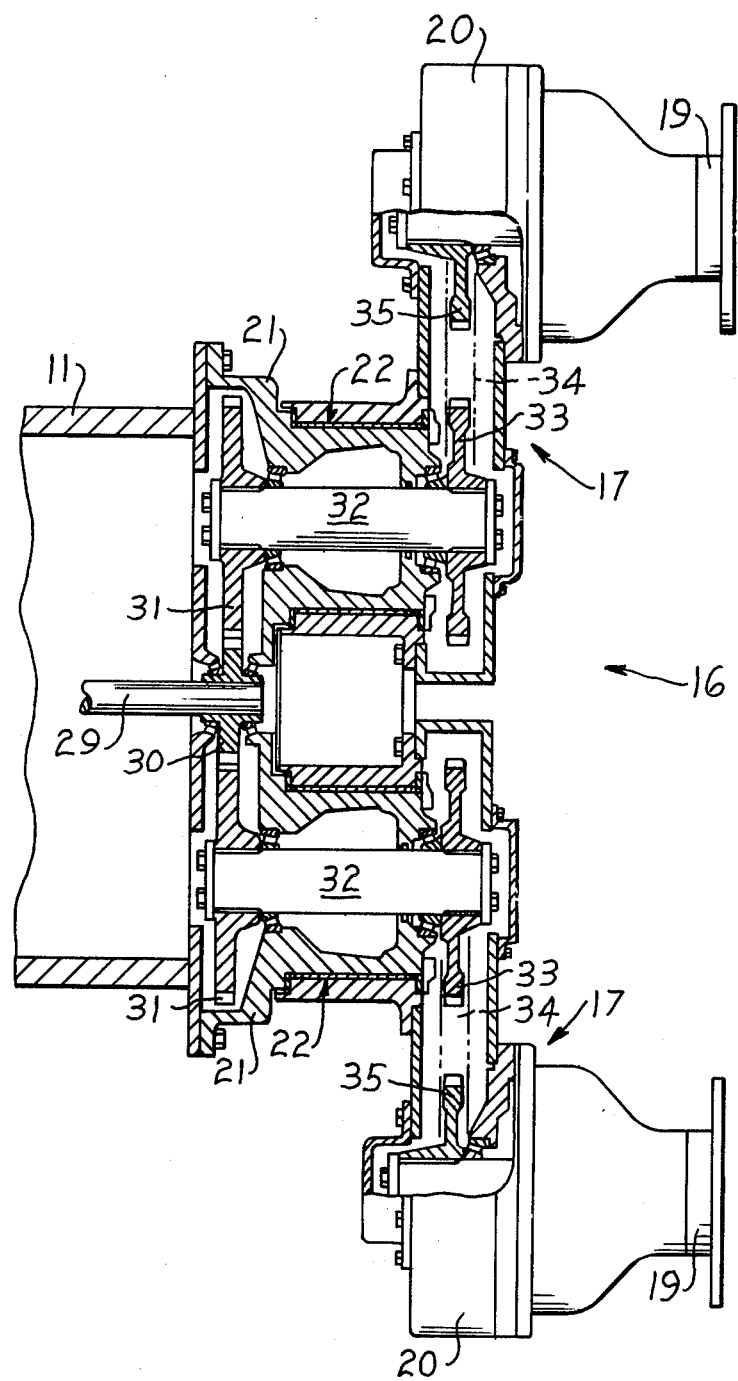
FIG. 4 is an enlarged top plan view of the tandem drive arrangement, taken in the direction of arrows IV—IV in FIG. 1 and partially sectioned for clarification purposes.

FIG. 5 schematically illustrates a hydraulic fluid circuit employed in the leveling system of this invention;

FIGS. 6 and 7 are views similar to FIG. 2, but illustrating a modified form of the tandem drive arrangement shown in two sequential positions of a leveling operation; and FIG. 8 is a top plan view of a portion of the modified tandem drive arrangement and a drive train therefor, taken in the direction of arrows VIII—VIII in FIG. 6 and partially sectioned for clarification purposes.

DETAILED DESCRIPTION

FIG. 1 illustrates a motor grader 10 comprising a main frame 11 having an operator's cap 12 mounted rearwardly thereon. The motor grader comprises a conventional mold board 13 suitably suspended beneath the frame by conventional mechanisms, including a circle drawbar 14. The forward end of the frame is supported on a pair of laterally spaced front roadwheels 15 (one shown) whereas the rearward end of the vehicle is supported on a pair of laterally spaced tandem drive arrangements 16 of this invention (one shown).

Each drive arrangement 16 comprises a pair of substantially identical roadwheel assemblies 17. Each roadwheel assembly comprises a tire 18 suitably mounted on a rim (not shown) which is, in turn, attached to a drive axle or hub 19 (FIG. 4). The hub is rotatably mounted on a lever arm 20 which is pivotally mounted on a spindle 21, secured to frame 11, by annular bearing means 22.

Referring to FIGS. 1–3, an actuating means, preferably in the form of a double-acting hydraulic cylinder 23, is pivotally interconnected between lever arms 20 to selectively pivot roadwheel assemblies 17 simultaneously relative to each other and relative to frame 11. For example, FIG. 1 illustrates roadwheel assemblies 17 of one tandem drive arrangement 16 disposed at ground level G whereas FIG. 2 illustrates extension of cylinder 23 to pivot the roadwheel assemblies downwardly to a lowered position, disposing them at a recessed level G'. As shown in FIG. 3 and as schematically illustrated in FIG. 2, roadwheel assemblies 17' of tandem drive arrangement 16', disposed on the opposite side of the vehicle, can be raised slightly to an elevated disposition depicted at level G" upon retraction of cylinder 23'.

FIG. 5 schematically illustrates a hydraulic fluid circuit for effecting selective extension or retraction of cylinders 23 and 23' and for conditioning the cylinders to function as damped springs, along with rubber tires 18. As suggested above, a motor grader is a shaping and finishing tool which requires precise control of blade or mold board 13 during a particular grading operation. The tandem mounted rubber tires employed on conventional motor graders provide a versatile machine which exhibits high mobility and relatively high travel speeds but function primarily as undamped springs in support of the motor grader.

As shown in FIG. 5, a pressurized hydraulic fluid source for cylinders 23 and 23' comprises a reservoir 24 and an engine-driven pump 25 adapted to selectively communicate pressurized fluid to the cylinders to effect the above-described extension or retraction thereof. A directional control valve means 26 is adapted to provide such selective communication to the cylinder and to a lock-out valve means 27. The lock-out valve means, in turn, is adapted to communicate with a standard accumulator 28.

In the illustrated positions of valves 26 in FIG. 5, pressurized fluid is communicated to the head ends of cylinders 23 and 23' to extend the cylinders. Actuation of valve means 26 to their extreme opposite positions would function to communicate pressurized fluid to the rod ends of the cylinders to retract the same. It should be understood that each valve means 26 may be actuated independently to extend cylinder 23 and to retract cylinder 23', for example, as illustrated in FIG. 3.

After the roadwheel assemblies have been pivoted to their selected positions to level the motor grader for a grading operation, valve means 26 may be actuated to their intermediate positions to thereby block-off communication of pressurized fluid to the cylinders. Thus, lock-out valve means 27 may be shifted from their blocking positions illustrated in FIG. 5 to their operative positions, communicating fluid from the accumulators to the cylinders. The cylinders will thereafter function as damped springs to absorb road shocks and the like encountered by the motor grader during operation thereof.

Referring once again to FIG. 4, the drive train for each roadwheel assembly 17 comprises an input drive shaft 29 suitably connected to the engine of the motor grader to be driven thereby. The shaft is secured to a drive pinion 30 which meshes with a pair of spur gears 31, each secured to one end of a countershaft 32. A drive sprocket 33 is secured to the opposite end of the countershaft and has a schematically illustrated chain 34 entrained thereabout. The chain is further entrained over a driven sprocket 35, secured to drive axle or hub 19. The drive train is duplicated for purposes of driving the second tandem roadwheel, as indicated by identical numerals depicting like drive arrangements.

FIGS. 6–8 partially illustrate a motor grader 10a having a modified tandem drive arrangement 16a mounted on each lateral side thereof (one shown). Corresponding constructions are depicted by identical numerals, but with numerals depicting modified constructions in FIGS. 6–8 being accompanied by an "a".

As shown, tandem drive arrangement 16a comprises a pair of tandem roadwheel assemblies 17a each having a tire or roadwheel 18a rotatably mounted on a lever arm 20a thereof. As shown in FIG. 8, the inner end of the inboard lever arm 20a is pivotally mounted by annular bearing means 36 on a spindle 21a, suitably secured to main frame 11a of the motor grader, and the inner end of outboard lever arm 20a is pivotally mounted on an annular clamp 37, suitably secured to the inboard lever arm. An annular clamping plate 38 is detachably secured to clamp 37 to clamp an annular bearing means 22a on either side of the inner plate portion of the outboard lever arm.

As further shown in FIG. 8, a drive input shaft 32a, suitably connected to the engine of the motor grader, has its outer end secured to a pair of drive sprockets 33a. Outboard drive sprocket 33a is, in turn, drivingly connected to a driven sprocket 35a by means of a chain 34a to selectively drive roadwheel 18a via a drive axle 19a secured to the driven sprocket. A second chain 34a is likewise entrained over inboard drive sprocket 33a to drive the second tandem roadwheel via a corresponding second driven sprocket, chain and drive axle (not shown).

The embodiments of the invention in which an exclusive property or privilege is claimed are defined as follows:

1. A construction vehicle comprising
   a frame,
   a pair of tandem roadwheel assemblies mounted on each lateral side of said frame,
   pivot means pivotally mounting each of said roadwheel assemblies on said frame, and
   actuating means comprising a single double-acting cylinder interconnected directly between said pair of roadwheel assemblies for pivoting said roadwheel assemblies simultaneously and in unison relative to each other and relative to said frame to selectively vary the vertical height of said frame relative to ground level.

2. The construction vehicle of claim 1 wherein said construction vehicle constitutes a motor grader having blade means mounted forwardly thereon.

3. The construction vehicle of claim 1 wherein each of said roadwheel assemblies comprises a lever arm pivotally mounted on said frame by said pivot means and wherein said cylinder is pivotally connected to said lever arm.

4. The construction vehicle of claim 3 wherein said pivot means comprises a spindle secured to said frame and annular bearing means pivotally mounting said lever arm on said spindle.

5. The construction vehicle of claim 3 wherein a separate said pivot means pivotally mounts each of said lever arms on said frame with the respective pivot means being spaced longitudinally relative to each other.

6. The construction vehicle of claim 3 wherein said pivot means is common to the lever arms of said pair of tandem roadwheel assemblies.

7. The construction vehicle of claim 1 wherein said actuating means further comprises a pressurized fluid source and directional control valve means for selectively communicating pressurized fluid to said cylinder from said pressurized fluid source.

8. The construction vehicle of claim 7 further comprising accumulator means communicating with said cylinder for communicating fluid thereto.

9. The construction vehicle of claim 8 further comprising lock-out valve means interconnected between said directional control valve means and said accumulator means for selectively preventing communication of fluid from said accumulator means to said cylinder.

10. The construction vehicle of claim 1 further comprising drive means connected to each of said roadwheel assemblies for selectively driving the roadwheels thereof.

* * * * *